United States Patent [19]

Selzer

[11] Patent Number: 5,029,822
[45] Date of Patent: Jul. 9, 1991

[54] DEVICE FOR ADJUSTING THE INCLINATION OF THE BACKREST OF A SEAT

[75] Inventor: Günther Selzer, Wulfrath, Fed. Rep. of Germany

[73] Assignee: Aero-Design Technology Inc., Valencia, Calif.

[21] Appl. No.: 581,200

[22] Filed: Sep. 10, 1990

Related U.S. Application Data

[63] Continuation of Ser. No. 449,111, Dec. 7, 1989, abandoned, Continuation of Ser. No. 196,869, May 20, 1988, abandoned, Continuation of Ser. No. 883,063, Jul. 8, 1986, abandoned.

[30] Foreign Application Priority Data

Jul. 10, 1985 [DE] Fed. Rep. of Germany ....... 3424602

[51] Int. Cl.⁵ .......................... A47C 1/024; B60N 1/06
[52] U.S. Cl. .................... 267/64.12; 74/104; 74/501.5 H; 74/519; 267/131; 297/306; 297/355
[58] Field of Search .............. 267/64.11, 64.12, 64.18, 267/117, 131; 188/2 D, 300; 74/102, 104, 500.5, 501.5 R, 501.5 H, 519; 297/306, 347, 355

[56] References Cited

U.S. PATENT DOCUMENTS

| | | | |
|---|---|---|---|
| 3,130,646 | 4/1964 | Pennington | 92/13.6 X |
| 3,589,209 | 6/1971 | Howell | 74/501.6 |
| 3,837,704 | 9/1974 | Bauer | 297/355 X |
| 4,155,433 | 5/1979 | Porter | 403/108 X |
| 4,354,398 | 10/1982 | Porter | 74/501.6 |
| 4,515,034 | 5/1985 | Porter | 74/541 X |

FOREIGN PATENT DOCUMENTS 7921268 10/1979 Fed. Rep. of Germany.

Primary Examiner—Andres Kashnikow
Attorney, Agent, or Firm—Fulwider Patton Lee & Utecht

[57] ABSTRACT

A device for adjusting and locking the inclination of the backrest of a seat, for example an aircraft seat, comprises a gas compression spring which acts between the back rest and the frame of the seat and which is of the type which has a locking and release member, which, when pressed frees the spring to expand or to be compressed and when released locks the spring in any position in which it is set to lock the back rest. The locking and release member is operated by a button fitted in an arm rest of the seat. To enable the button to operate the locking and release member entirely mechanically, the button is connected to one end of a Bowden cable through a first lever and the other end of the Bowden cable is connected to the locking and release member through a second lever. The two levers together provide a mechanical advantage of 8:1 between the force applied to the button and that acting on the locking and release member.

3 Claims, 5 Drawing Sheets

DEVICE FOR ADJUSTING THE INCLINATION OF THE BACKREST OF A SEAT

This application is a continuation of application Ser. No. 07/449,111, filed Dec. 7, 1989, which is a continuation of Ser. No. 07/196,869, filed May 20, 1988, which is a continuation of Ser. No. 06/883,063, filed July 8, 1986, all of which are abandoned.

FIELD OF THE INVENTION

This invention relates to a device for adjusting and locking the relative positions of two members which are pivotally connected to each other. It is especially applicable to the adjustment and locking of the inclination of the back rest of a seat, for example of an aircraft or railway seat, by means of a piston-cylinder unit which is actuated by a cable release device controlled by a push-button disposed in an arm rest of the seat.

BACKGROUND OF THE INVENTION

Existing adjustable back rests used in aircraft and vehicle seats always incorporate hydraulic piston-cylinder units in conjunction with mechanical springs for adjusting and locking the backrest in position. The springs restore the back rest to its starting position when it is unloaded. A push-button is connected via a Bowden cable to a lever which, when the push-button, which is mounted on the arm rest of the seat is pressed in, acts upon a releasing member of the hydraulic cylinder, with the result that the locking of the piston-cylinder unit is released and the piston rod of the unit can be displaced against the force of the springs. When the push-button is released, the piston-cylinder unit locks any further movement. In this manner a seat back can be adjusted and locked as desired in a predetermined angular range usually of up to 28°.

The hydraulic piston-cylinder unit, together with the spring system which is frequently very complicated and failure-susceptible, is very expensive. In spite of the complication, associated with not inconsiderable cost, in the use of these adjustment devices, hydraulic piston-cylinder units have been used exclusively. With this arrangement, the release force required on the push-button is only slight, not exceeding 20–30N. It can thus be operated by children. Moreover, the release mechanism must be capable of installation, together with other accessories such as ashtrays, call-button and light switches, within the restricted dimensions of about 40 mm width of the arm rest.

Starting from the consideration that, on the one hand a sufficient restoring force of the spring system is necessary and thus the force required for releasing the adjustment movement is inevitably correspondingly high, the main object of the present invention is to provide an adjustment and locking device which avoids the use of a hydraulic piston-cylinder unit and mechanical springs, which needs no more than the permissible release forces on the push-button and can be installed subsequently in existing seats without further modification of the seats themselves.

SUMMARY OF THE INVENTION

To this end, according to this invention a device for the adjustment and locking in position of a pivoted member, such as the back rest of a seat, comprises a gas compression spring which acts on the member and which is of the type which has a locking and release member, which, when pressed frees the spring to expand or to be compressed and when released locks the spring in any position in which it is set, and a manually operated push-button which operates the locking and release member through a lever which increases the force applied to the push-button and which is connected to the release member, preferably by a cable such as a Bowden cable.

Owing to the mechanical advantage or transmission ratio achieved by the lever, the release force applied to the locking and release member of the gas compression spring, which is directly dependent upon the restoring force exerted by the spring, i.e. the force which brings the back rest into its starting position, can be produced by a much smaller force acting on the push-button in the arm rest. Gas compression springs of the type used in the invention are conventionally known and are commercially obtainable in a wide variety of constructions and sizes.

A mechanical advantage or transmission ratio is advantageously obtained by a further release lever which acts upon the locking and release member and which is connected with the lever of the push-button by the cable. The lever ratio at the push-button can be about 2:1 and the lever ratio of the release lever at the gas compression spring can be about 4:1. Owing especially to the first transmission ratio, as soon as the button is pressed and the off centre levering force is initiated, and owing to the second transmission ratio at the release lever acting on the gas compression spring, even where the force for releasing and locking the gas spring is high, the force required at the push-button in the arm rest can be kept within the desired range by selecting the favourable lever ratios. The length of the lever acting on the locking and release member of the gas compression spring can be reduced sufficiently for this lever to be housed within the specified, limited space of the seat. In particular, with a first lever ratio at the release button of 2:1, the installation depth within the limited dimensions of the arm rest can easily be achieved. For example, a gas compression spring suitable for standard seats must have a restoring force of approximately 350N. The necessary release force at the locking and release member is then about 130N. The desired release force at the push-button in the arm rest should, for a release travel of 10 mm, not exceed 20N to 30N and preferably be only 15N. This can be achieved with two levers having an overall transmission ratio of the levers of approximately 1:8, the total transmission ratio being already reduced by one half by the off-centre application of the force via the first lever at the push-button in a ratio of 2:1. Depending upon the construction of the lever in the arm rest, the release force at the spring can be reduced solely by the lever at the push-button sufficiently for the desired easy operation to be possible.

The push-button preferably has diametrically oppositely projecting guide cams which engage in slits of a cylindrical cover sleeve. The guide cams seat in inside-wall recesses of a collar which surrounds the sleeve at least in the region of the slits. Thus, in spite of the eccentric loading of the push-button lever, the push-button can move linearly uniformly and be free of tilting when it is pressed in.

The making of the movement of the push-button, linear, uniform and free of tilting in spite of the eccentric force application to the lever may alternatively be effected by a collar which has a screw-threaded projection and is screwed, preferably with a spring in between, to the cover sleeve. This has the advantage of simplifying the construction of the cover sleeve, since the push-button is now only guided in the collar. Differences in construction and manufacturing tolerances can be taken up by the spring between the sleeve and the collar.

To take up the installation and manufacturing tolerances, the release lever may have an adjustment screw at the point where it acts on the locking and release member of the gas compression spring. The taking-up of tolerances is advantageously further assisted by the use of a Bowden cable as the cable which connects the two levers to each other, since lengthening or shortening of the cable can be achieved by an adjustment screw located at one end of the Bowden cable.

The release lever may be pivoted on a base arm which is mounted on the piston rod of the gas compression spring. The release lever may then have a bolt fixed in position to it and the base arm may have a spring-loaded adjustment nut in a bore for adjusting the Bowden cable. In this case, installation clearances or tolerances and length differences can be taken up by manual adjustment of the adjustment nut. The spring acting upon the adjustment nut and thus also upon the base arm assists restoration of the gas spring to its elongated condition when the locking and releasing member is released.

A stroke limiting sleeve which may be fixed to the piston rod of the spring may have spaced-apart radial slits for receiving a clip to anchor the sleeve on the rod. Thus a defined limitation of the adjustment within the maximum piston stroke of the gas compression spring and therefore within the range of the maximum possible inclination of the back rest can then be achieved by inserting the clip in an appropriate one of the slits, the piston rod travel being varied by the clip inserted into one of the slits and thus limiting the adjustment travel of the piston rod.

Instead of the sleeve which is permanently pushed over the piston rod of the gas compression spring, in those cases where stroke limitation is required, stroke limiting washers may be coaxially fixed on the piston rod in any one of a plurality of positions by a retaining ring. With these washers, which are fitted as required, the weight of the device and in particular of the gas compression spring can be reduced. This is important in aircraft where weight savings are of great importance.

A screw-threaded rod may be provided at the end of the gas compression spring remote from the piston rod. This makes installation of the device possible in various kinds of seats, because a connection or attachment, e.g. a fork-head, can be screwed, according to the installation requirements to a greater or lesser distance onto the screwed rod. In this way the gas compression spring can be set to different lengths and the space requirement for installation can be regulated or reduced.

DESCRIPTION OF THE DRAWINGS

Two examples of devices in accordance with the invention will now be described with reference to the accompanying drawings in which.

DESCRIPTION OF THE EMBODIMENTS

Figure 1:
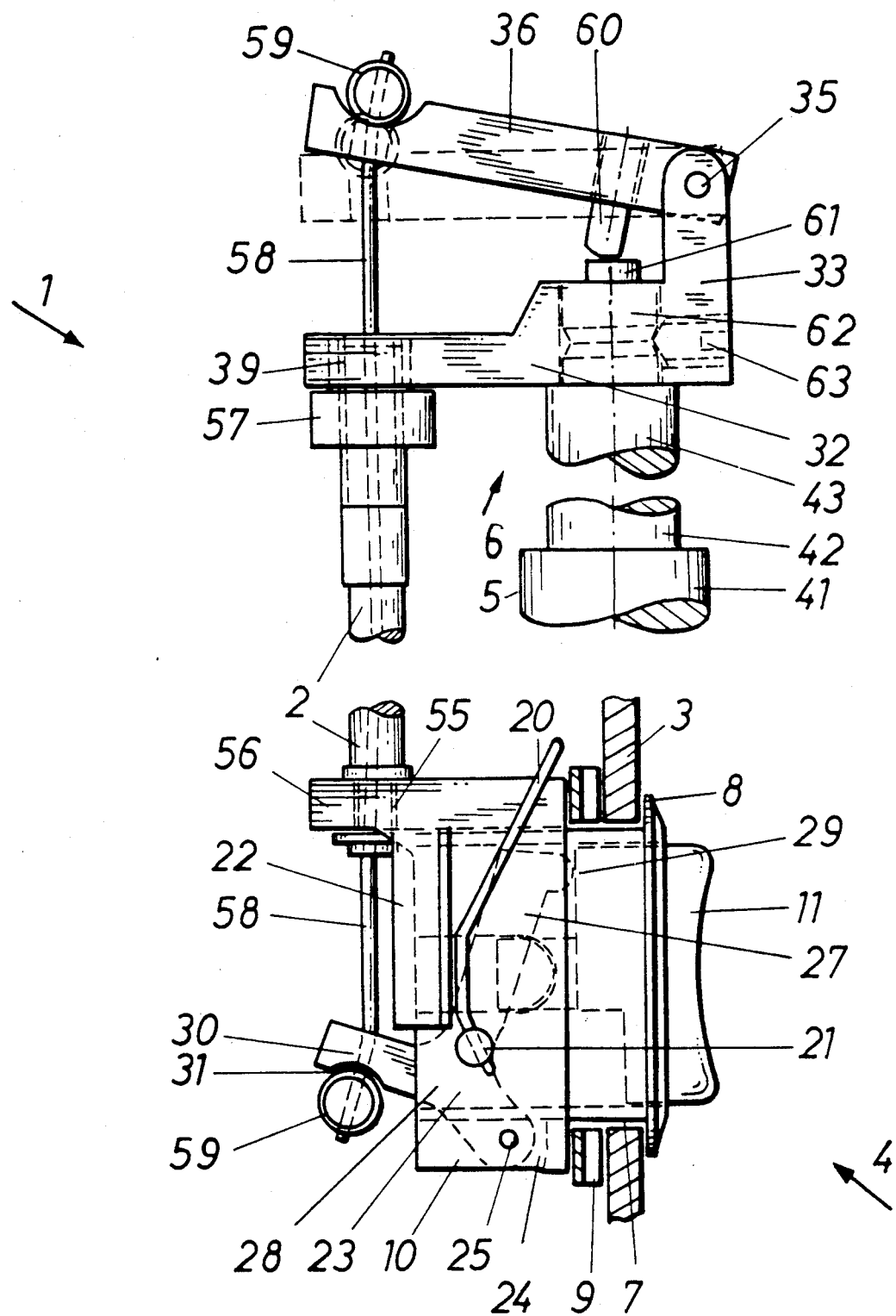
FIG. 1 is a side view of the first example of the device with parts broken away, the device being for locking the inclination of a seat back rest which is not shown.
Figure 2:
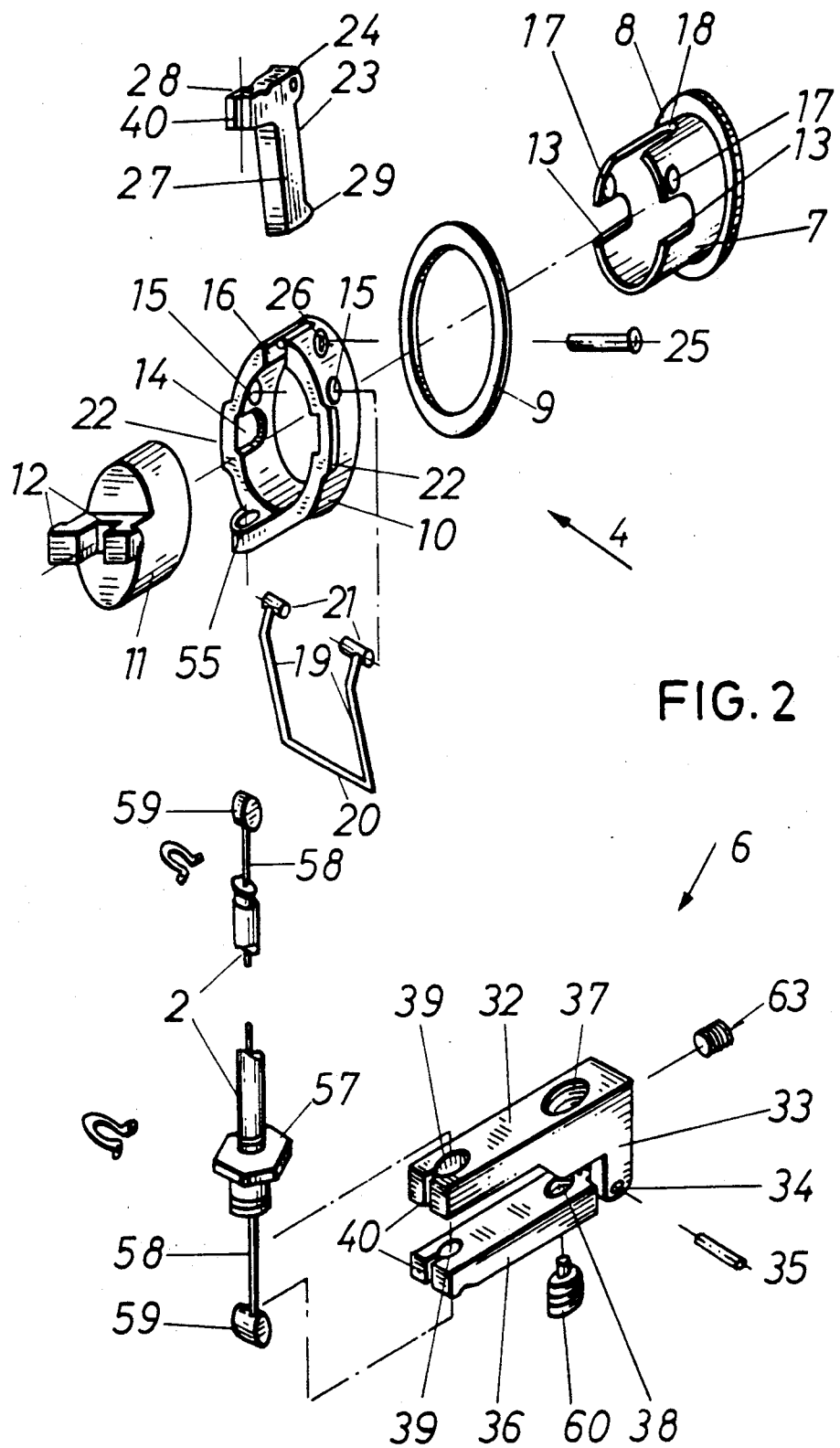
FIG. 2 is an exploded perspective view of the device of FIG. 1.

A device 1 for adjusting and locking the inclination of the back rest of a seat, not shown, comprises two components, which are connected together by a Bowden cable 2 and are disposed in a schematically illustrated arm rest 3 and a seat frame of the seat, not illustrated. The components are a release head 4 and a lever linkage 6 which acts on a gas compression spring 5. As illustrated in FIG. 2, the release head 4 comprises a cylindrical cover sleeve 7, which, when installed, bears with a flange 8 against the outside of the arm rest 3 (FIG. 1), a spring washer 9, which bears against the inside of the wall of the arm rest 3, a collar 10 surrounding the sleeve 7 and a push-button 11, which engages with diametrically opposite guide cams 12 into axial slits 13 of the sleeve 7.

The guide cams 12 project into inside-wall recesses 14, in register with the slits 13, of the collar 10 surrounding the sleeve 7. This ensures tilt-free guidance when the push-button 11 is pushed in and prevents slipping out forwards. In the collar 10, also, there are two aligned, opposite bores 15 and an axial longitudinal groove 16, with which are associated, accurately in position, bores 17 and an axial longitudinal groove 18 of the sleeve 7. At the upper ends of arms 19 of a U-shaped spring 20, inwardly pointing pins 21 are disposed. These engage in the bores 15, 17 respectively of the collar 10 and of the sleeve 7.

The spring 20 which is stressed (FIG. 1) secures the release head 4 in its installed position in the interior of the arm rest 3 where it is no longer accessible after installation. Portions of the arms of the spring 20 extend to within a short distance of rib-like external projections 22 on the upper edge of the collar 10. Before the start of installation or dismantling, the spring 20 is pushed parallel to the cable 2 and its arms slide over the projections 22 and disengage the collar 10 and the sleeve 7.

Figure 4:
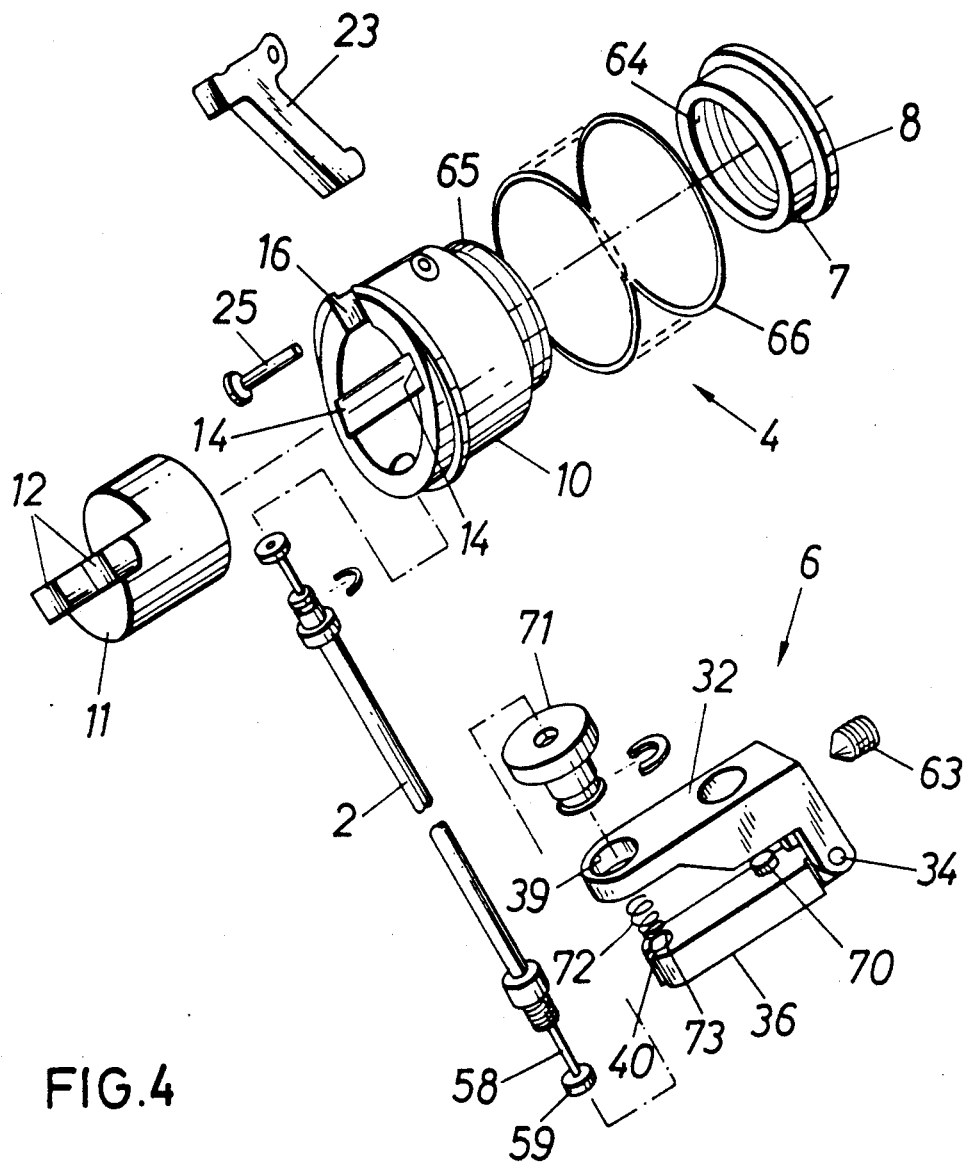
FIG. 4 is a perspective exploded view of a second example of part of the device.

In the embodiment of the release head 4 shown in FIG. 4, the cover sleeve 7 has an internal screw-thread 64 and the collar 10 has a screw-threaded journal 65. The components 7 and 10 can be joined together by simply screwing the sleeve 7 on to the screw-threaded journal 65. A spring 66, which is pushed between them on to the screw-threaded journal 65, takes up any manufacturing clearances that there may be. An element securing the release head 4 in position in the arm rest, for example the spring 20 shown in FIGS. 1 and 2, is no longer necessary, because retention in the arm rest 3 is ensured by the screw connection.

A three-armed lever 23 has one arm pivotally journalled with a bearing flange 24 in the longitudinal groove 16, and is also seated by the axial longitudinal groove 18 of the sleeve 7. The lever 23 is secured by a pin 25, which passes through bores 26 transversely to the groove 16. The other two arms 27, 28 of the lever 23 are of different lengths and are approximately at right angles to each other. The longer arm 27, starting from the bearing point, i.e. the pin 25, bridges almost the entire internal diameter of the collar 10 and is approximately twice as long as the arm 28, which projects axially of the collar 10. The arm 27 has, at its outer end, a nose 29 and the lever 28 has a longitudinal slit continuing into a bore 30 and a shell-like depression 31.

The lever linkage 6, which is mounted on the gas spring 5, which is in turn mounted on the seat frame at a distance from the release head 4, comprises a rigid base arm 32 having a vertical rib 33, at the upper end of which a release lever 36 is pivotally journalled by a pin 35 which is pushed through a transverse bore 34 of the vertical rib 33. The base arm 32 has a bore 37, parallel to the rib 33, and the release lever 36 has a screw-threaded bore 38 aligned with the bore 37. Both the arm 32 and the lever 36 have longitudinal slits 40, continuing at their forward end faces into bores 39.

Figure 3:
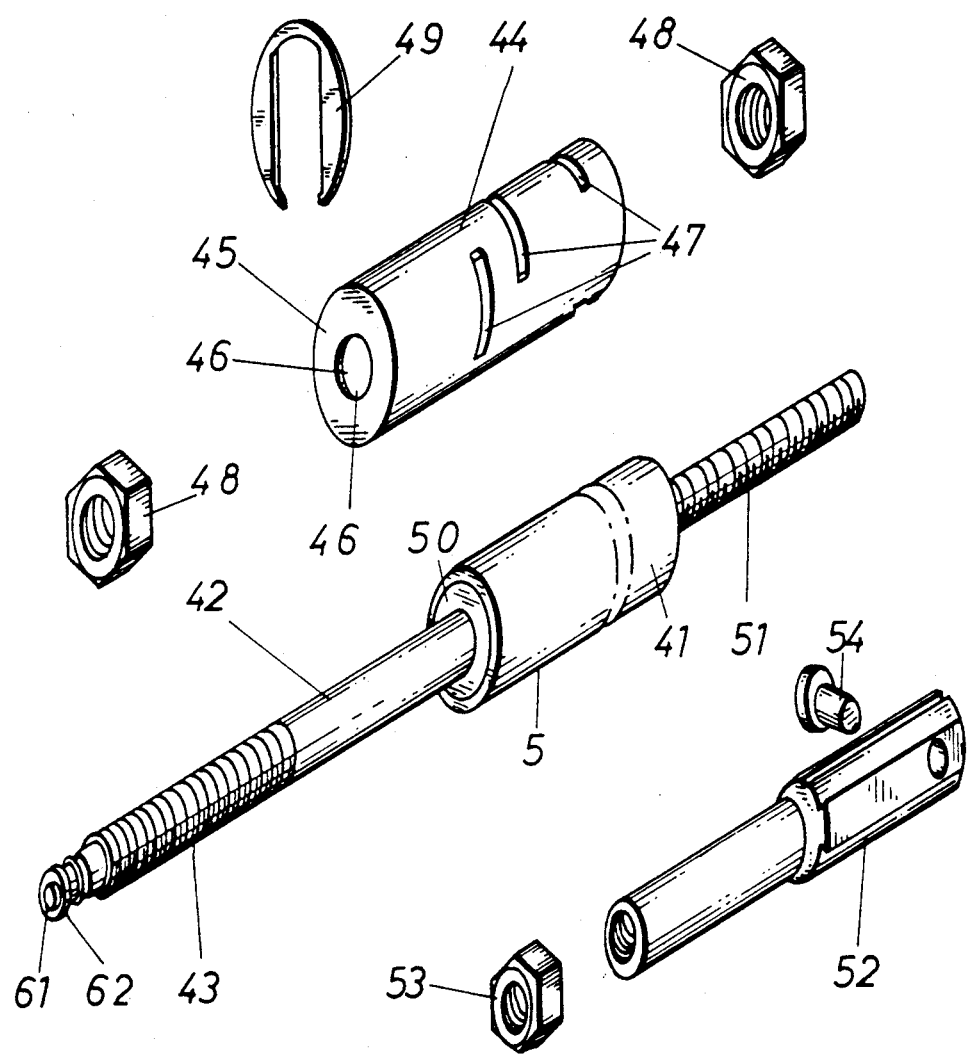
FIG. 3 is an exploded perspective view of parts of the device comprising a gas compression spring with additional or auxiliary elements on a piston rod and a screw-threaded pin of the gas compression spring.
Figure 5:
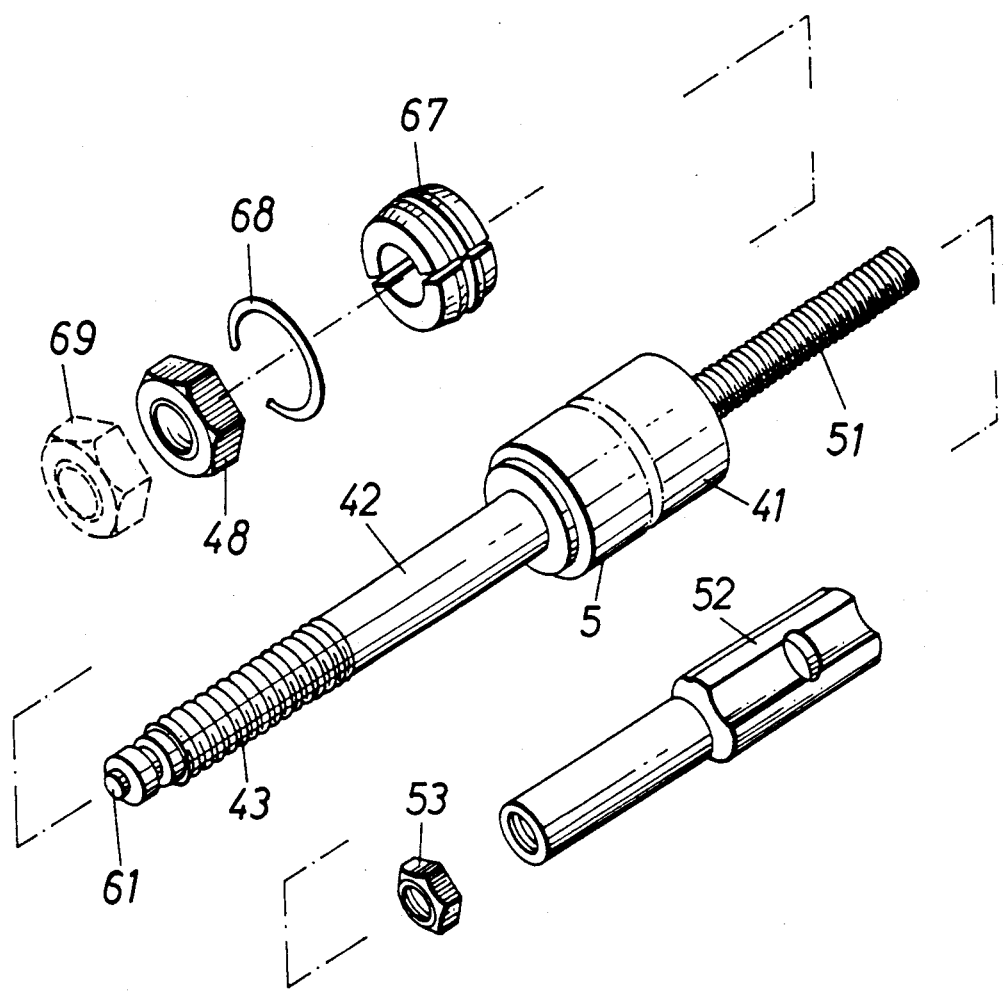
FIG. 5 is a perspective view of parts of the second example comprising a gas compression spring and a stroke limiting washer capable of being fixed on the gas compression spring.

A piston rod 42, which is guided in a cylinder 41 of the gas compression spring 5 illustrated in FIG. 3, has a forward screw-threaded portion 43 and is provided with a stroke limiting sleeve 44. The cylindrical sleeve 44 is open at one end and is terminated at the other end by a base 45 having a bore 46 for the passage of the piston rod 42. It also has radial slits 47, disposed at spacings one from another. The sleeve 44 is pushed on to the piston rod 42 and is secured by nuts 48 and by a seat attachment, not shown, which enclose the base 45 between them. The maximum stroke of the piston rod 42 can then be limited as desired, depending upon which of the radial slits 47 a clip 49 is engaged in. When the piston rod 42 moves, the washer bears against the end wall 50 of the cylinder 41 and prevents further movement of the piston rod. The internal diameter of the sleeve 44 is somewhat larger than the external diameter of the cylinder 41 and it is pushed over the cylinder 41. Alternatively, a stroke limiting washer 67 of a desired length, illustrated in FIG. 5, can be fixed as a stop on the piston rod 42 by a retaining ring 68, and be secured by the nuts 48 and also, if necessary, by a lock-nut 69. At the rear end of the cylinder 41, a screw-threaded rod 51 is disposed. A fork head 52 is screwed to a greater or lesser distance on to the cylinder 41 and is arrested in the desired limiting position by a nut 53. A tension element, not illustrated, of the back rest of the seat can be connected to the fork head 52 by means of a bolt 54.

In their installed positions illustrated in FIG. 1, the release head 4 and the lever linkage 6 are connected together by the Bowden cable 2. The Bowden cable 2 is pushed at one end into a bore 55 of an axial wall projection 56 of the collar 10 and at the other end into the bore 39 of the base arm 32 where it is secured by washers. By means of an adjusting screw 57, the effective length of the inner cable 58 of the Bowden cable can be varied. The ends of the cable 58 have clamping bars 59, which after the cable ends have been hooked into the end slits 40 and the bores 39, 38 of the lever arms 28, 32, 36, are secured.

Adjustment of the inclination of the back rest is effected by pressing in the push-button 11, which, in moving inwards, slides with the guide cams 12 in the slit 13 of the sleeve 7 and the recesses 14 of the collar 10. The force on the button is transferred eccentrically via the nose 29 on to the lever arm 27 and the lever 23 is moved about the pin 25, so that the cable 58 of the Bowden cable 2 is pulled downwards by the lever arm 28. The release lever 36 thus shifts from the position shown in full lines in FIG. 1 into the horizontal position shown in broken lines. The release lever 36 then cooperates, through an adjustment screw 60 screwed into the screw-threaded bore 38, with a release and locking member 61 of the gas compression spring 5. When the member 61 is pushed downwards as seen in FIG. 1, the gas spring is free to expand or to be compressed by the application to it of a sufficient force and when the member 61 is released, the gas spring is locked rigid at the length at which it is set upon release of the member 61 taking place. The gas compression spring is secured by a screw-threaded part 62 in the bore 37 of the base arm 32. The screw-threaded part 62 has a smaller diameter than the screw-threaded portion 43 of the piston rod 42 and is secured against loosening in the base arm 32 by a grub screw 63. The member 61 projects beyond the base arm 32 out of the bore 38. The adjustment screw 60 can, alternatively, be replaced by a fixed bolt 70 of the release lever 36 as shown in FIG. 4. Dimensional differences can then be taken up by an adjustment nut 71, which engages in the bore 39 of the base arm 32 and is connected to the cable 58. A spring 72, which bridges across the distance between the base arm 32 and the release lever 36, bears against an end recess of the adjustment nut 71 and a recess 73 oriented coaxially with the bore 39 of the release lever 36. The spring 72 assists restoration of the piston rod 42 of the gas compression spring 5.

When the adjustment screw 60 comes into contact with the locking and release member 61 of the piston rod 42, the rigid locking of the gas spring is cancelled, so that the back rest, provided it is being pushed or pulled, adjusts in its inclination, because the piston rod 42 is slid inwards or outwards in the cylinder 41. As soon as the push-button 11 is released, the two-arm lever 23 returns to its starting position illustrated in FIG. 1 under the tension force of the Bowden cable 2 and the release lever 36 of the lever linkage 6 returns to the position shown in full lines in FIG. 1, causing contact with the release and locking member 61 via the adjustment screw 60 to be interrupted. At the same instant, the gas compression spring 5 blocks any further adjustment in the inclination of the back rest.

A slight pushing-in of the push-button 11 takes place when blocking of the gas compression spring is released, due to the division into two parts of the transmission from the push-button to the adjustment screw 60 and the member 61. The lever ratio of 2:1 is determined, for a push-in distance of the push-button 11 of 10 mm, by adapting the distances from the point of action of the arm 27 with the nose 29 against the push-button 11 to the pivot point 25 and the point of action of the lever arm 28 against the bolt 59 of the cable to the pivot-point 25. The second transmission ratio of 4:1 in the lever linkage 6 is determined by the distance of the pivot arm 36 from the point of action on the bolt 59 of the cable 58 to the pivot point 35 and the distance from the pivot-point 35 to the point of action of the adjustment screw 60.

I claim:

1. A device for the adjustment and locking of the inclination of a backrest pivotally mounted on a passenger seat having an armrest, said device including gas compression spring means adapted to act between said backrest and said seat, said gas compression spring means including a movable locking and release member and means for moving said locking and release member between a release portion in which said gas compression spring means is free to expand or to be compressed and a locking position in which said gas compression spring means is locked rigid, said means for moving said locking and release member including a manually operated push-button in the armrest of the passenger seat adapted to move along a centrally located longitudinal axis and a mechanical connecting means operatively connecting said push-button to said locking and release member, said connecting means including a pivotally mounted crank having first and second lever portions for movement by said push-button with the first lever portion engaging the push-button off-center from the longitudinal axis thereof and the second lever portion engaging cable means operatively connected to the locking and release member, said means for moving said locking and release member including a release lever acting on said locking and release member and operatively connecting said release lever to said first lever portion by said cable means, and wherein said push-button acts on said first lever portion with a first lever ratio and said release lever acts on said locking and release member with a second ratio between said locking and release member and said cable means, and also wherein the push-button includes guide cams projecting in diametrically opposite positions from said push-button, a cylindrical cover sleeve, means defining slits in said cylindrical cover sleeve, with said guide cams engaging in said slits, a collar surrounding said sleeve at least in the region of said slits and means defining recesses in said collar, said guide cams being seated in said recesses.

2. Apparatus as claimed in claim 1, in which said push-button is slidingly seated in said collar and said collar includes screw-threaded journal means screwed to said cover sleeve.

3. A device as claimed in claim 2, further comprising spring means acting between said cover sleeve and said collar.

* * * * *